Aug. 22, 1939.    W. LOCKHART    2,170,533
METHOD OF AND APPARATUS FOR BURNISHING
Original Filed Oct. 8, 1935    2 Sheets-Sheet 1
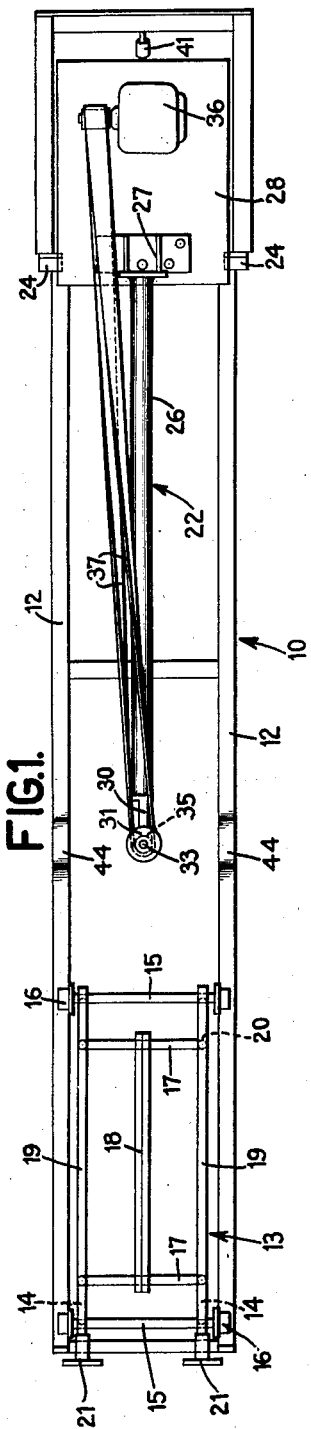
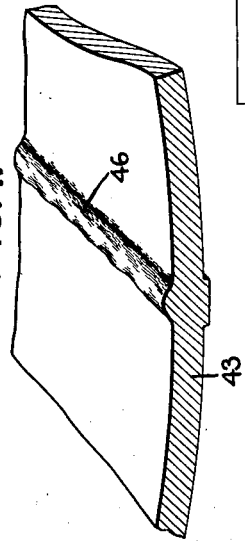
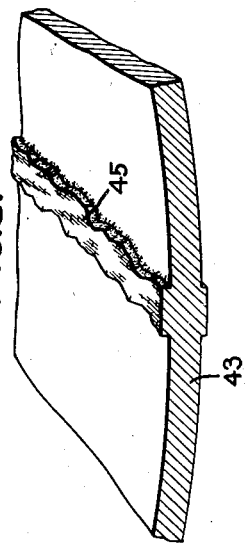
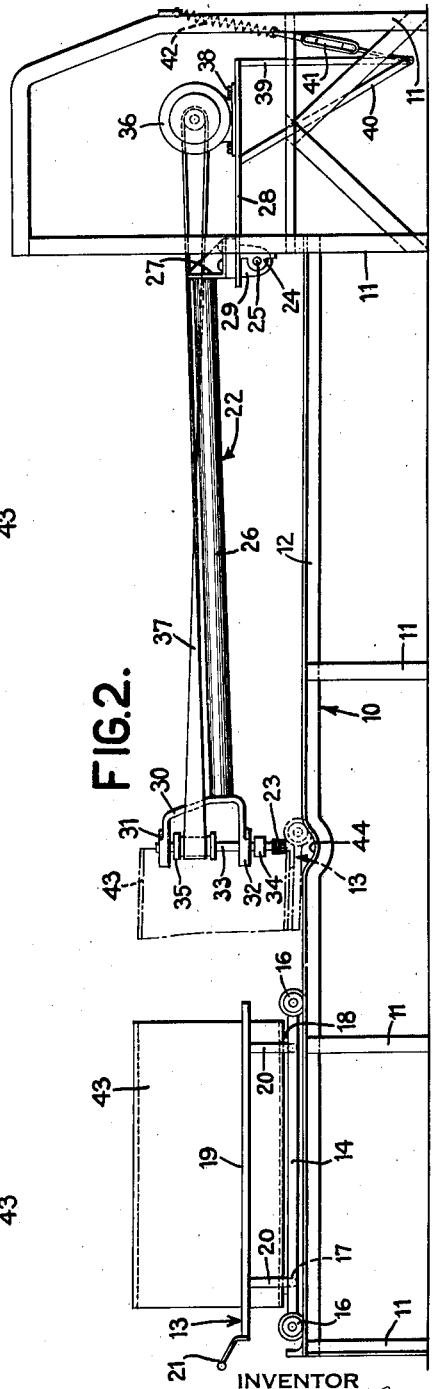
INVENTOR
William Lockhart
BY
Clarence D Kerr
ATTORNEY Aug. 22, 1939.  W. LOCKHART  2,170,533
METHOD OF AND APPARATUS FOR BURNISHING
Original Filed Oct. 8, 1935  2 Sheets-Sheet 2
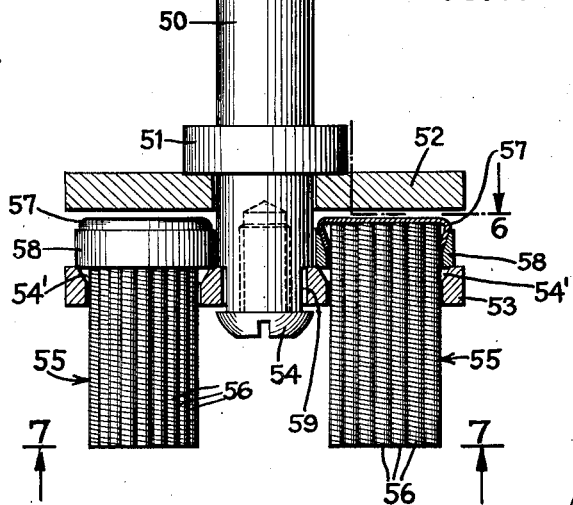
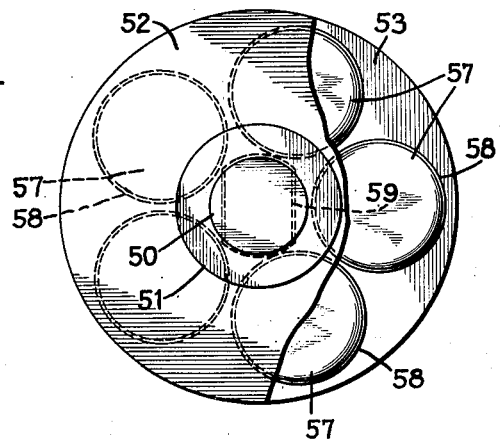
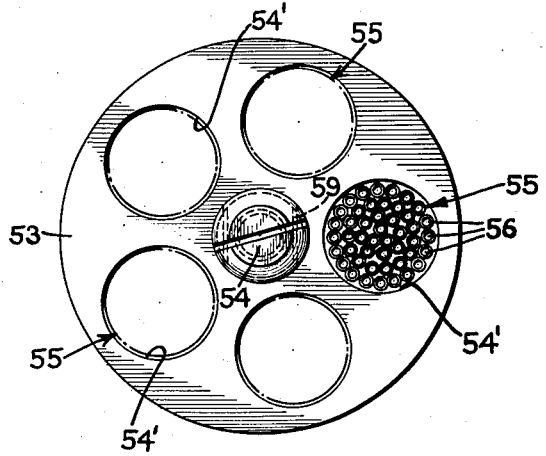
INVENTOR
William Lockhart
BY
Clarence D Kerr
ATTORNEY Patented Aug. 22, 1939

2,170,533

UNITED STATES PATENT OFFICE 2,170,533

METHOD OF AND APPARATUS FOR BURNISHING

William Lockhart, Northfield, Ohio, assignor to The National Steel Barrel Company, a corporation of Ohio Application October 8, 1935, Serial No. 44,003
Renewed February 11, 1939

18 Claims. (Cl. 29—90)

This invention relates to burnishing apparatus and method of carrying out a burnishing operation and is particularly directed to the smoothing of the rough edges of welded seams and other imperfections on steel barrels and the like.

A customary type of welding for joining thin sections of sheet steel in butt relationship is the type known as flash welding. In this method of welding, two sections of metal are brought together and current caused to flow from one to the other as they contact each other, thus producing instantaneous high temperatures localized at the points of juncture. The chief practical difficulty in employing this method of welding is the raised burr which is left at the weld joint due to the application of pressure while the metal is in a state of fusion. Such burrs are rather difficult to completely remove so that the surface will take a good finish. It is a well recognized fact that finishes such as paints, enamels and the like cannot be successfully applied to rough surfaces but crack and peel off because there is not a uniform adherence. It is an object of this invention to smooth over roughened surfaces such as caused by flash welding and to round the sharp edges of such surfaces so that a lasting finish may be applied to the metal without the necessity of grinding the burr down to a uniformly smooth surface.

One feature of my invention resides in apparatus for carrying out a burnishing operation on large tubular products such as steel barrels, and more particularly apparatus for burnishing the interior of such tubular products.

Further objects and advantages of this invention will be apparent from the following description of the drawings, in which:

Figure 1 is a plan view of apparatus for burnishing an inner longitudinally extending burr on tubular products such as barrels.

Figure 2 is a side elevation of the machine shown in Figure 1, showing a barrel mounted on the carriage and illustrating in dotted lines the front end of a barrel as it starts the burnishing operation.

Figure 3 is a greatly enlarged section of a flash welded joint, showing a burr which has been roughly trimmed but not burnished.

Figure 4 is a view similar to Figure 3 but showing the inner burr of the seam after burnishing.

Figure 5 is a vertical sectional view through the center of one type of burnishing tool which may be employed in accordance with my invention.

Figure 6 is a plan view of this burnishing tool taken on the line 6—6 of Figure 5.

Figure 7 is a bottom view taken on the line 7—7 of Figure 5.

My improved burnishing apparatus is supported on a frame 10, which may be raised from the floor a suitable distance by legs 11 and which includes parallel tracks 12. A carriage 13 may be mounted on these tracks and preferably comprises longitudinal side members 14, 14 and axles 15, 15. These axles carry wheels 16 at their outer ends spaced to cooperate with track members 12. Cross braces 17, 17 may be employed to lend rigidity and strength. Centrally disposed of the carriage on these cross braces, there may be mounted a suitable supporting member 18, which is preferably a piece of angle iron positioned with the corner thereof on top to provide a sharp edged support. This member is adapted to support the base of a barrel or other tubular section 20 to be treated along a longitudinal seam thereof, and is preferably aligned with the burnishing tool and its support described below. Side members 19, 19 are supported on the upwardly extending arms 20 along each side of the carriage, to prevent the barrels or other tubular products from rolling off said carriage and to form a cradle therefor with the member 18. The carriage may be driven automatically or simply moved by hand by means of the handles 21. An arm 22 carrying the burnishing tool 23 is pivotally mounted at one end of the tracks by means of pivot pin 25 in the bracket 24. This arm may be made up of a tubular member 26 carrying a bracket 27 at its inner end which is fixed to the floating table 28. Immediately below bracket 27, a downwardly extending strap 29 is fixed to the table through which the pivot pin 25 extends. Thus arm 26 and platform 28 are rigidly connected together and both are pivotally supported by the pin 25. The working or outer end of the member 26 supports a vertical yoke 30 having upper and lower bearing members 31, 32 in which shaft 33 is rotatably mounted. Any suitable type of chuck 34 may be fixed to the lower end of this shaft which is adapted to receive the burnishing tool 23. Shaft 33 has fixed thereto a suitable pulley 35 intermediate the arms of said yoke which may be connected to the motor 36 by means of suitable belting 37. Motor 36 is preferably fixed to the floating platform or table 28 by means of bolts 38. This floating table is equipped with a downwardly extending member 39 and a diagonal brace 40 which are attached at their lower ends to a suitable turn-buckle arrangement 41. The upper end of this turnbuckle is connected to a coil spring 42 which is attached to one of the legs 11 at a point above the table. Thus, the outer end of member 26, carrying the burnishing tool, is normally held in depressed position by the spring 42, which acts to lift the motor supporting table 28.

In the operation of this device a barrel 43, or other tubular member, is mounted on the carriage 13 with the burr thereof directly over the support 18. The carriage is then pushed forwardly toward the burnishing tool 23 which is continuously rotating being driven by the motor 36. As the forward end of the barrel approaches the tool, the two forward wheels of the carriage may dip downwardly into the depressions 44 in tracks 12 to prevent the barrel edge from striking the side of the rotating burnishing tool. The barrel edge is thereby brought up directly under the rotating tool as illustrated in dotted lines in Fig. 2. The barrel and/or the tool should be moved vertically to effect the initial engagement of the two. This may be also accomplished if desired by eliminating the depressions 44 in the tracks and lifting the rotating tool as the barrel edge approaches the same. The carriage may now be pushed forwardly at the desired rate of travel and, if desired, may be moved back and forth several times. During this burnishing action the tool is positively held against the burr by spring 42 and produces a smooth finish by rounding all rough edges and removing any oxide or other scale adjacent the welded joint.

The motor may receive power for driving the tool through any suitable flexible cable. If desired the motor may be mounted adjacent the tool on member 26 but the construction illustrated is preferred because it is more nearly balanced and avoids the necessity of using large springs and/or counterweights.

Figures 3 and 4 illustrate a section of a barrel before and after treatment with my novel burnishing apparatus respectively on a greatly enlarged scale. Burrs from flash welding and the like are customarily removed by a simple pair of cutters, but as shown in Figure 3 these cutters do not completely remove the burr, particularly burr 45 on the inside of the barrel. This burr is not regular but has very sharp ragged edges and the portions of metal immediately adjacent are frequently heavily coated with a refractory mixture of oxides and burned metal.

Figure 4 illustrates the same section after the sharp edges have been rounded by the treatment just described and shows the smooth burr 46 well adapted to effectively retain a coating of enamel or other finish.

Referring more particularly to Figures 5–7, I have illustrated therein a burnishing tool which has been found to be particularly suitable for use in a burnishing apparatus of the character described. This burnishing tool comprises a shank 50, having a small collar 51 fixed thereto. Disc like member 52 is loosely carried by the shank immediately below said collar and a second disc like member 53 is loosely held on the lower end of said shank by means of the bolt 54 threaded thereto. This lower disc 53 is fitted with a plurality of openings 54' to receive the burnishing elements 55. These burnishing elements may be made of a plurality of small helical springs 56 held at their top by a suitable cover member 57 which may be simply upset and crimped in place. Each burnishing element is also equipped with a collar 58 having a tapered inner wall to prevent the elements from sliding through the holes 54' in the lower disc 53. Thus, while each of these burnishing elements is positively held in a correct position the tool, as a whole, has considerable play and is adapted to wobble slightly as it is rotated. The individual coil springs are quite flexible and tend to bend as the tool is rotated thus giving a brushing action. The lower end of shank 50, carrying the disc 53, may be irregularly shaped, as shown in Figures 6 and 7, at 59 to insure positive rotation of the burnishing elements and the disc 53. The upper disc 52 is simply employed to hold the burnishing elements against the work and to hold the tool in assembled relationship.

In use, such a tool is particularly efficient since it covers an area somewhat wider than its diameter due to the wobbling movement and assures positive removal of scale, along with a polishing and smoothing action of rough edges, as distinguished from a true grinding action.

Other burnishing tools may be employed with my apparatus with good results.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a process of making a steel barrel, the steps of welding a seam in said barrel, burnishing to remove the rough edges of the seam and coating the burnished surfaces.

2. The process of making steel barrels comprising forming a sheet of steel into a tube, flash welding the adjacent edges of the tube, burnishing the weld seam to smooth the rough edges and remove scale and enameling the burnished surface.

3. A process of finishing the interior of large tubular welded products including the steps of rough trimming the burr formed inside a tube by the welding operation, and smoothing the rough edges of said burr by burnishing without entirely removing the burr.

4. In a process of finishing large welded tubular products the step of burnishing a burr inside a tube formed during the welding operation comprising, supporting the outside of the tube along the weld seam, and abrading the burr on the inside of said tube and the zone adjacent said burr to clean the metal and remove rough edges without entirely removing the burr.

5. In a process of finishing large welded tubular products the step of burnishing a burr inside a tube formed during a welding operation comprising, supporting the outside of the tube along the weld seam, applying a burnishing tool to the burr of the tube, and effecting relative movement between said tool and the tube in its supported position.

6. In a process of finishing large welded tubular products the step of burnishing a burr inside a tube formed during a welding operation comprising, supporting the outside of the tube along the weld seam, applying a rotary burnishing tool having a brushing action to the burr of the tube, and effecting relative movement between said tool and the tube in its supported position.

7. Apparatus for burnishing tubular members comprising means for supporting a tubular member substantially throughout the length of a seam burr thereof and means for applying a burnishing tool to said burr, opposite the support.

8. Apparatus for burnishing tubular members comprising means for supporting a tubular member substantially throughout the length of a seam burr thereof, means for applying a burnishing tool to said burr inside said member, and means for effecting relative movement between said member and the tool to move the latter along the burr.

9. Apparatus for burnishing tubular members comprising a carriage adapted to support a tubular member having a portion for supporting a longitudinal seam of said member, an arm arranged to extend into the interior of said member, a burnishing tool rotatably mounted on said arm, and means for moving said carriage in the direction of said arm.

10. Apparatus for burnishing tubular members comprising a carriage adapted to support a tubular member along a longitudinal seam thereof, an arm, a burnishing tool mounted on said arm for rotation about an axis substantially at right angles to said arm and normal to the surface of said member, means for continuously rotating said tool, and means for moving said carriage in the direction of said arm with said tool engaging said seam.

11. Apparatus for burnishing an inner surface of large tubular members comprising a carriage adapted to support a tubular member, an arm arranged to extend into the interiors of said members, a burnishing tool rotatably mounted on said arm for engaging only a portion of said member, means to rotate said tool, resilient means for urging said tool into contact with said member, and means for moving said carriage in the direction of said arm while said tool is resiliently held in contact with said member.

12. Apparatus for burnishing tubular members comprising a carriage adapted to support a tubular member, an arm pivoted intermediate the ends thereof, a rotatably mounted burnishing tool on one end of said arm, means supported near the opposite end of the pivoted arm for rotating said tool, and means for moving said carriage in the direction in which said arm extends.

13. Apparatus for burnishing the interior of tubular members including a set of tracks, a carriage for supporting a tubular member mounted on said tracks, an arm carrying a burnishing tool extending in the direction of said tracks, said tracks having depressions therein at points approximately below said tool.

14. Apparatus for burnishing the interior of tubular members including a set of tracks, a carriage for supporting a tubular member mounted on said tracks, an arm extending in the direction of said tracks, and a burnishing tool mounted thereon for continuous rotation, said tracks having depressions therein at points approximately below said tool.

15. Apparatus for burnishing the interior of tubular members including a set of tracks, a carriage mounted on said tracks for supporting a tubular member, means on said carriage for supporting said tubular member along a longitudinal seam thereof, an arm extending in the direction of said tracks, a burnishing tool comprising a plurality of helical springs mounted on the outer end of said arm for rotation about an axis substantially parallel to the axes of said springs, and means for continuously rotating said burnishing tool.

16. A process of finishing a large tubular welded product having a seam burr comprising burnishing said burr on the interior of the article to remove scale and smooth any rough edges without entirely removing the burr.

17. A process of making a tubular product comprising forming a sheet of metal into a tubular article, flash welding adjacent edges of said article together, and burnishing the weld burr and adjacent surfaces inside said article to smooth rough edges without entirely removing said burr.

18. A process of finishing a large tubular welded product having a seam burr comprising applying to said burr on the interior of the article a rotary burnishing tool having a plurality of helical springs substantially parallel to the axis of rotation of the tool, said axis being substantially normal to the surfaces being treated to produce a brushing action.

WILLIAM LOCKHART.